United States Patent [19]
Luchner et al.

[11] Patent Number: 6,064,582
[45] Date of Patent: May 16, 2000

[54] CURRENT CONVERTER FOR INCREASING CURRENT AND DECREASING VOLTAGE

[75] Inventors: Michael Luchner, Filderstadt; Werner Schiemann, Fellbach, both of Germany

[73] Assignee: The Foxboro Company, Foxboro, Mass.

[21] Appl. No.: 09/360,464

[22] Filed: Jul. 23, 1999

Related U.S. Application Data

[63] Continuation of application No. PCT/US98/02579, Feb. 11, 1998.
[60] Provisional application No. 60/037,898, Feb. 11, 1997.

[51] Int. Cl.$^7$ .................................................. H02M 3/18
[52] U.S. Cl. .............................. 363/59; 307/110; 363/73
[58] Field of Search .................................. 363/59, 60, 62, 363/73; 320/166; 307/110

[56] References Cited

U.S. PATENT DOCUMENTS

| | | | |
|---|---|---|---|
| 5,095,223 | 3/1992 | Thomas | 307/110 |
| 5,179,289 | 1/1993 | Sridharan | 363/60 |
| 5,568,035 | 10/1996 | Kato et al. | 320/1 |
| 5,581,454 | 12/1996 | Collins | 363/59 |

*Primary Examiner*—Jessica Han
*Attorney, Agent, or Firm*—Jones, Day, Reavis & Pogue

[57] ABSTRACT

A continuously controlled current increasing charge pump having n series-connected input capacitors coupled to a voltage/current source for developing a constant output voltage of at least $$V_o = \frac{V_{in}}{n},$$

and an output current $I_o = nI_{in}$. Regulating circuits are also disclosed to regulate the output voltage. The charge pump consists of plural input switches that switch alternately the positive and negative sides of a like plurality of series-connected capacitors onto at least one output switch and output capacitor. The output switch is synchronized with the input switches and alternates between the negative and the positive output side of each capacitor.

24 Claims, 6 Drawing Sheets

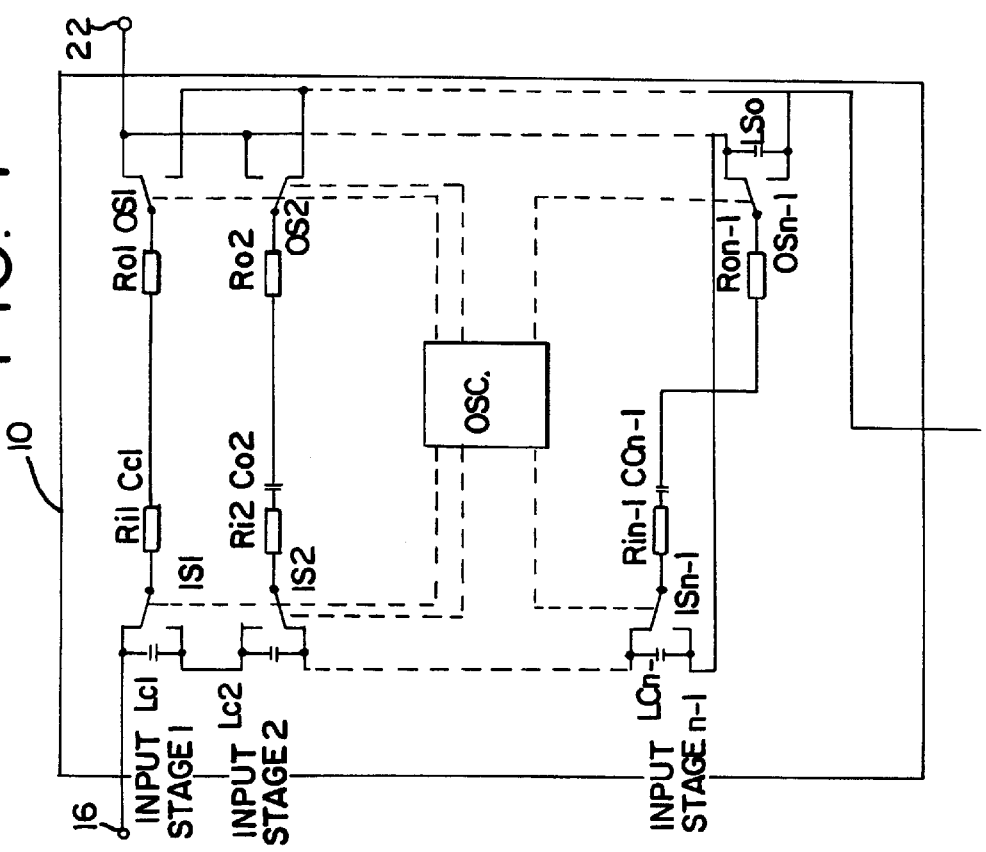
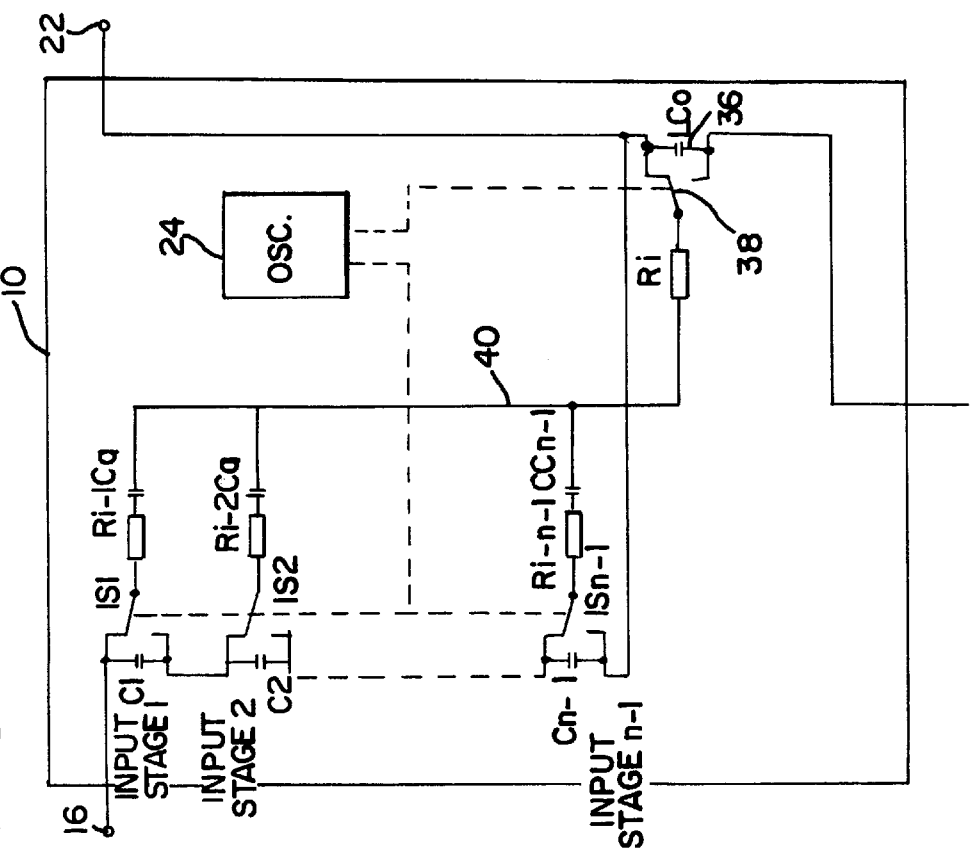

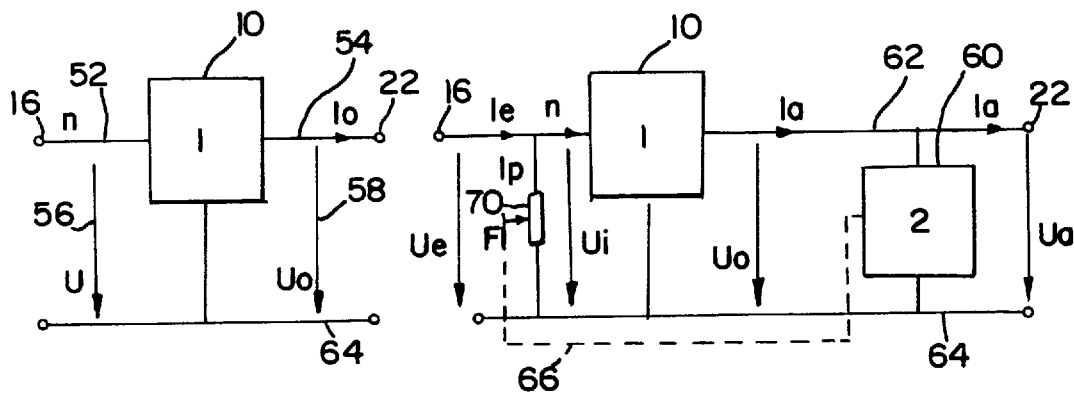
FIG. 7
FIG. 8
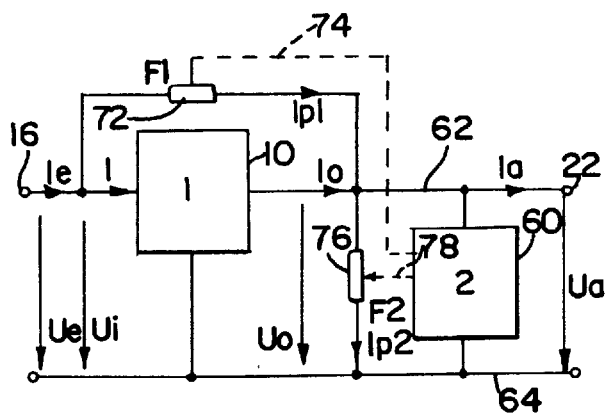
FIG. 9
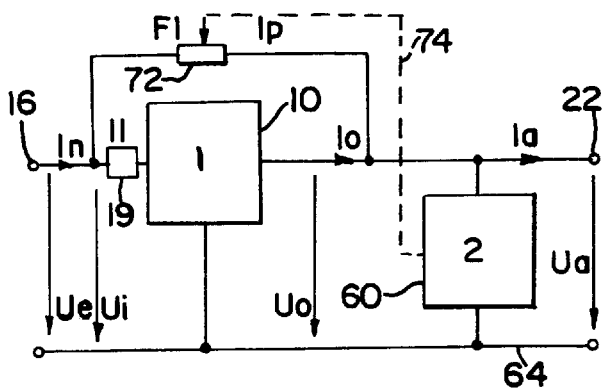
FIG. 10
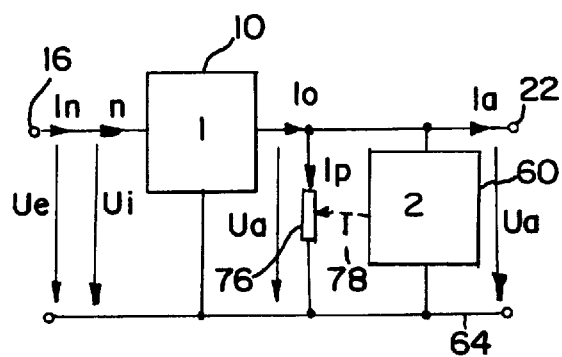
FIG. 11

CURRENT CONVERTER FOR INCREASING CURRENT AND DECREASING VOLTAGE

CROSS-REFERENCES TO RELATED APPLICATIONS

This application is a continuation of copending International Application Ser. No. PCT/US98/02579, filed Feb. 11, 1998 claiming the benefit of U.S. Provisional Application Ser. No. 60/037,898 filed Feb. 11, 1997.

BACKGROUND OF THE INVENTION

1. Field of the Invention

The invention relates generally to a continuously controlled current raising or increasing charge pump and in particular to a system for using such current-increasing charge pump to supply so-called two-wire devices.

To supply so-called two-wire devices, it is necessary to transform the applied voltages or currents into the needed ones with high efficiency. As the devices are often placed at long distances from their supply, it is very useful to have a flat or negative characteristic impedance behavior of the device. This enables the compensation of the voltage drop caused by the internal resistance of the long wires used to supply the devices.

2. Description of Related Art Including Information Disclosed Under 37 CFR 1.97 AND 1.98

Charge pumps are well known in the art and are used for many purposes. For instance, in the field of data processing, and with the use of modem microcontrollers in current electronic designs, they consume high currents at low voltages (with respect to the usual 24-volt supplies). Variable input voltages or variable load impedances are frequently encountered and the problem of providing a constant output voltage develops. Further, it is desirable that voltage regulation be susceptible to implementation in large-scale integration fashion.

U.S. Pat. No. 3,879,648 discloses a capacitive-based voltage reducer and regulator. It says nothing about current conversion.

In like manner, U.S. Pat. No. 5,581,454 discloses a DC/DC voltage converter using capacitor arrays that can step up or step down the input voltage. It utilizes only capacitors and switches but must be connected and disconnected from the power supply source or the output capacitor during its operation.

SUMMARY OF THE INVENTION

The present invention transforms supplied voltages or currents into the needed ones with high efficiency. The current-increasing charge pump may be caused to have a flat or negative characteristic impedance behavior. This enables the compensation of the voltage drop caused by the internal resistance of the long wires used to supply the devices. The present charge pump concentrates on a version that increases current and decreases output voltage. This is because of modern microcontrollers that are used in current electronic designs. They consume high currents at low voltages with respect to the usual 24-volt supplies. Such a charge pump consists of plural input switches that switch alternately the positive and negative side of a like plurality of series-connected capacitors onto at least one output switch and output capacitor. This output switch is synchronized with the input switches and alternates between the negative and the positive output side of each capacitor. Thus, it is in principle an n-stage bleeder chain in which the switches and capacitors represent the impedances of the bleeder chain. The voltages at the series-connected input capacitors are therefore equal and have a value of the input voltage divided by the number of input stages, n. Coupling capacitors are coupled to each of the switches in parallel and block the DC signal and transmit the AC signal to the output capacitor. The output voltage results from the input voltage, $V_{in}$, divided by n minus the voltage loss across the switches and capacitors.

Providing switches that bypass one or more of the input stages enables, for an increasing input current, a reduction of the input voltage without changing the output voltage or output current. This is useful in designs that need to work at different operating currents. Using semiconductor switches, a microprocessor can be used to control the switching arrangement.

Further, by providing the nth input capacitor to serve also as the output capacitor, an output voltage of $$V_o = \frac{V_{in}}{n}$$

also is provided.

Further, if each of the input switches is coupled to a corresponding output switch that is coupled to the output capacitor so as to place all corresponding input and output switches in parallel, the input impedance of the charge pump is reduced considerably.

Such charge pumps may be used in a two-wire system with a voltage or current-sensing regulator on the output of the charge pump for controlling a variable impedance across the input voltage to the charge pump. This embodiment enables a constant input voltage as well as the ability to control small variations of the output current. The electronic controller may be a PID regulator or a combination thereof such as a P regulator or a PI regulator. Such regulator may also be an operational amplifier with an additional voltage reference.

It is also possible to use a voltage/current regulator across the output of the charge pump to control a first variable impedance that is in parallel shunt relationship with the charge pump and a second variable impedance that is across the output lines of the charge pump to enable a negative characteristic impedance of the charge pump as well as provide a constant output voltage.

In another version, regulating the output voltage by only shunting the charge pump eases the design but requires a bidirectional working charge pump. This means the charge pump must be able not only to shift current from input to output but also must be able to shift current backwards from the output to the input. This embodiment excludes diodes from use as output switching elements.

Thus, it is an object of the present invention to provide a current converter for decreasing the voltage output and increasing the current output of the charge pump.

The invention also relates to a charge pump having n capacitors in series with a switching arrangement allowing a switch associated with each of the n capacitors to switch between the positive and negative side of the capacitor and couple the outputs in parallel to provide and output voltage of $$V_o = \frac{V_{in}}{n}$$

and an output current of $n \times I_{in}$.

The invention further relates to a charge pump having n capacitors in series with a switching arrangement coupled to the capacitors to bypass as many of the n stages as necessary to maintain the same output voltage and output current with a reduced input voltage if the input current is higher.

It is yet another object of the present invention to provide a charge pump that utilizes n series connected capacitors with the nth capacitor used as an output capacitor to provide an output voltage $$V_o = \frac{V_{in}}{n}$$

It is still another object of the present invention to provide a system for supplying two-wire devices from an input voltage/current source and ground system in which the input voltage to the charge pump is regulated by a voltage/current regulator sensing the output voltage/current of the charge pump.

It is another object of the present invention to provide a system for supplying two-wire devices from an input voltage/current source that has a voltage/current regulator sensing the output voltage/current and varying the first impedance in shunt with the charge pump and a second impedance in parallel with the output of the charge pump to enable a negative characteristic impedance as well as provide a constant output voltage.

It is still another object of the present invention to provide a system for supplying two-wire devices from an input voltage/current source in which the output voltage of the charge pump is controlled by regulating a variable impedance shunting the charge pump in parallel and in which a bidirectional working charge pump is utilized.

It is also an object of the present invention to provide a system for supplying two-wire devices from an input voltage/current source wherein the output voltage of the charge pump is regulated with the use of a voltage/current sensing regulator sensing the voltage/current output of the charge pump and varying the impedance of a device connected across the output of the charge pump to provide a constant output voltage but in which the input voltage increases with increasing input current.

Thus, the invention relates to a current converter having an internal impedance and providing a desired voltage and current to a load and comprising a voltage/current source providing a voltage, $V_{in}$, and a current, $I_{in}$, n input capacitors coupled in series with the voltage/current source for developing a voltage, $$V_c = \frac{V_{in}}{n},$$

across each input capacitor, each of the n input capacitors having a positive side and a negative side, an output capacitor for providing an output voltage to a load, and means for synchronously and repetitively coupling the voltage, $$V_c = \frac{V_{in}}{n},$$

on the positive and negative sides of each input capacitor in parallel to the output capacitor to provide an output voltage of $$V_o = \frac{V_{in}}{n}$$

and an output current of $I_o = nI_{in}$.

The invention also relates to a system for supplying two-wire devices from an input voltage/current source and ground, the system comprising a charge pump having n series connected capacitors receiving a voltage, $V_{in}$, and current, $I_{in}$, from the voltage/current source and generating an output voltage, $$V_o = \frac{V_{in}}{n},$$

and output current, $I_o = nI_{in}$, between an output terminal and ground, a variable impedance coupled across the input voltage/current source and ground, and an electronic controller coupled across the charge pump output terminal and ground for sensing the charge pump output voltage/current and generating an output signal that is used to control the variable impedance thereby regulating the input voltage to provide a constant output voltage/current from the charge pump.

BRIEF DESCRIPTION OF THE DRAWINGS

These and other features of the present invention will be more fully disclosed when taken in conjunction with the following Detailed Description of the Preferred Embodiments in which like numerals represent like elements and in which:

FIG. 3 is a block diagram of a charge pump of the present invention in which the nth capacitor in series is also used as the output capacitor to provide an output voltage, $$V_o = \frac{2V_{in}}{n};$$

FIG. 4 is a block diagram of a modification of the circuit in FIG. 3 to provide a lower impedance of the charge pump;

FIG. 7 is a block diagram illustrating a charge pump of the present invention showing its input current and voltage and its output current and voltage;

FIG. 8 is a block diagram representation of a system for supplying voltage/current to a two-wire circuit and utilizing a voltage/current regulator to regulate the input voltage to a charge pump of the present invention and thereby regulate the output voltage;

FIG. 9 is a block diagram illustration of a system for supplying voltage/current to a two-wire system and having a circuit for regulating the output voltage by parallel shunting a charge pump of the present invention and parallel shunting the output voltage to give a negative characteristic impedance to the charge pump as well as provide a constant output voltage;

FIG. 10 is a block diagram illustrating another system for supplying voltage/current to a two-wire system and including the regulation of the output voltage of a charge pump of the present invention only by shunting the charge pump with a variable impedance that is controlled by a voltage/current sensor sensing the output voltage/current;

FIG. 11 is a block diagram of a system for providing a voltage/current to a two-wire system wherein the output voltage of a charge pump of the present invention is regulated by a voltage/current sensor sensing the output voltage/current and controlling the variable impedance across the output of the charge pump;

DETAILED DESCRIPTION OF THE PREFERRED EMBODIMENTS

Figure 1:
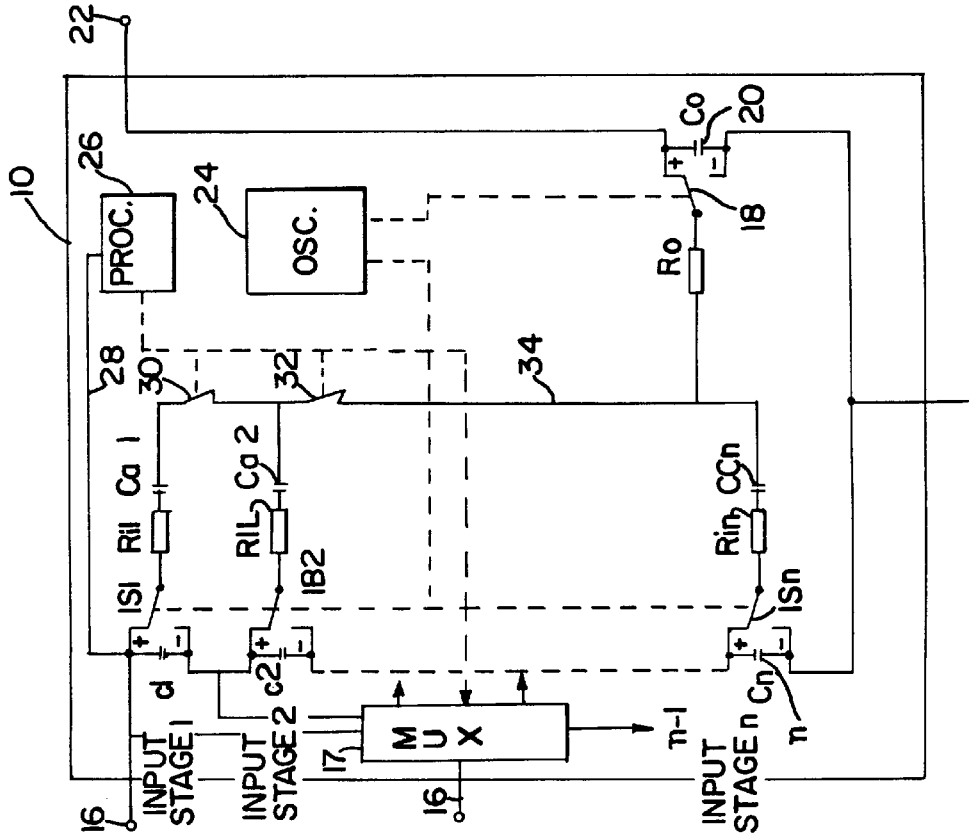
FIG. 1 is a schematic diagram of a first embodiment of the charge pump of the present invention.

FIG. 1 is a schematic diagram of the novel charge pump 10 of the present invention. It comprises n series connected input capacitors 12, 14, . . . n, connected to a current/voltage terminal 16 at the input to capacitor 12. As is well known in the art, the voltage applied on terminal 16 is equally divided among the capacitors 12, 14, . . . n, because each coupling capacitor, $C_1$–$C_n$ is switched to the output side from the positive to the negative of the output voltage at a high frequency by oscillator 24. On the input side of the coupling capacitors, $C_1$–$C_n$, the same AC voltage appears. It is necessary that the input and the output switches work exactly synchronously. Then the voltage can be transferred 1:1 to each of the input stages, which are in series and the total input voltage must be a multiple (n-times) of the output voltage. Thus, the charge pump is a current-increasing charge pump having n stages of n series connected input capacitors 12, 14, . . . n, coupled to the voltage/current source for developing an output voltage, $$V_o = \frac{V_{in}}{n},$$

across each capacitor. Each capacitor has a positive and a negative input as shown. An output capacitor 20 has a corresponding input and output for coupling to the load through output terminal 22. It can be seen that n parallel connected input switches, IS1, IS2, . . . ISn, are coupled to corresponding ones of the n input capacitors and are capable of alternating and synchronously moving from a first position to a second position for connecting the positive output and the negative output of its corresponding capacitor synchronously to the positive and negative output of capacitor 20 thereby providing, an output voltage, $$V_o = \frac{V_{in}}{n},$$

and an output current, $I_{out} = nI_{in}$.

A single output switch 18 is coupled between the parallel input switches IS1, IS2, . . . ISn and the output capacitor 20. The single switch 18 alternately moves from a first position to a second position and couples the n capacitor positive outputs and the n negative outputs to the output capacitor 20. A pulse-generating circuit such as oscillator 24 synchronously switches the single output switch 18 with the n parallel input switches IS1, IS2, . . . ISn, to provide the output voltage and output current to the output capacitor.

Each of the input switches, IS1, IS2, . . . ISn, may be a Mosfet switch that has an internal resistance, $Ri_1$, $Ri_2$, . . . $Ri_n$. The alternating current from the output of each of the input switches is coupled through a charge coupling capacitor, CC1, CC2, . . . CCn, to output line 34 that couples the charges in parallel to switch 18. Thus the coupling capacitors, CC1, CC2, . . . CCn, are interposed between each of the n input switches, IS1, IS2, . . . ISn, and the single switch 18 for blocking DC voltage and passing the AC voltage as the input switches move synchronously from the first to the second position.

Thus, for example only, if 10 V were applied to terminal 16 and ten input capacitors were coupled in series as shown, one volt would be developed across each capacitor. As each of the input switches switches between the positive and negative sides of each input capacitor, the positive and negative voltage is coupled on line 34 in parallel to output switch 18 and output capacitor 20, thus providing one-volt output. However, since each of the capacitors has a current stored and transferred in parallel, if the input current were 1 mA, the output current would be 10 mA because of the storage of 1 mA current in each of the capacitors and that are added together when coupled to the output capacitor 20.

Thus, $$V_o = \frac{V_{in}}{n}$$

and $I_o = nI_{in}$.

If desired, the circuit can be made functional to accommodate a change in voltage on the input terminal 16 by using a multiplexer 17 on the input. For instance, assume that the current at terminal 16 increases from 1 mA to 2 mA. A processor 26 monitors the current and upon detecting the change in current on line 28 transmits a signal to multiplexer 17 to bypass as many capacitors as necessary from the circuit and prevents transferring their output current and charges to the output capacitor 20. Thus, if the first to five stages would be bypassed by the processor 26, and only the sixth is operative, then 2 mA would be developed across the remaining five capacitors and the output current would remain at 10 mA. If the output voltage is the same, then the input voltage is five times the output. Of course, as shown in FIG. 1, if the processor 26 bypasses both the first and second stages, then their outputs would be bypassed and disconnected from the input current, but the voltage for each stage would remain the same multiple of the output voltage. Thus, by using an input multiplexer 17, only one of these stages would receive an input from multiplexer 17 at a time to prevent short circuiting of that input voltage.

Thus, as seen in FIG. 1 the invention further includes a multiplexer 17 for bypassing a plurality of stages in number in the range of from 1–(n–1). In this manner the multiplexer 17 can supply voltage to 1 out of n–1 of the n stages to provide essentially a constant output current, $I_o=iI_{in}$ where $i=1 \leq i \leq n$ for the selected stages not bypassed over a variable range of input currents. A microprocessor 26 is coupled to each of the n–1 stages and to the current source for detecting the input current and bypassing or isolating stages as necessary to maintain the output current as $I_o=nI_{in}$ $$\text{while} \quad V_o = \frac{V_{in}}{n}.$$

Figure 2A:
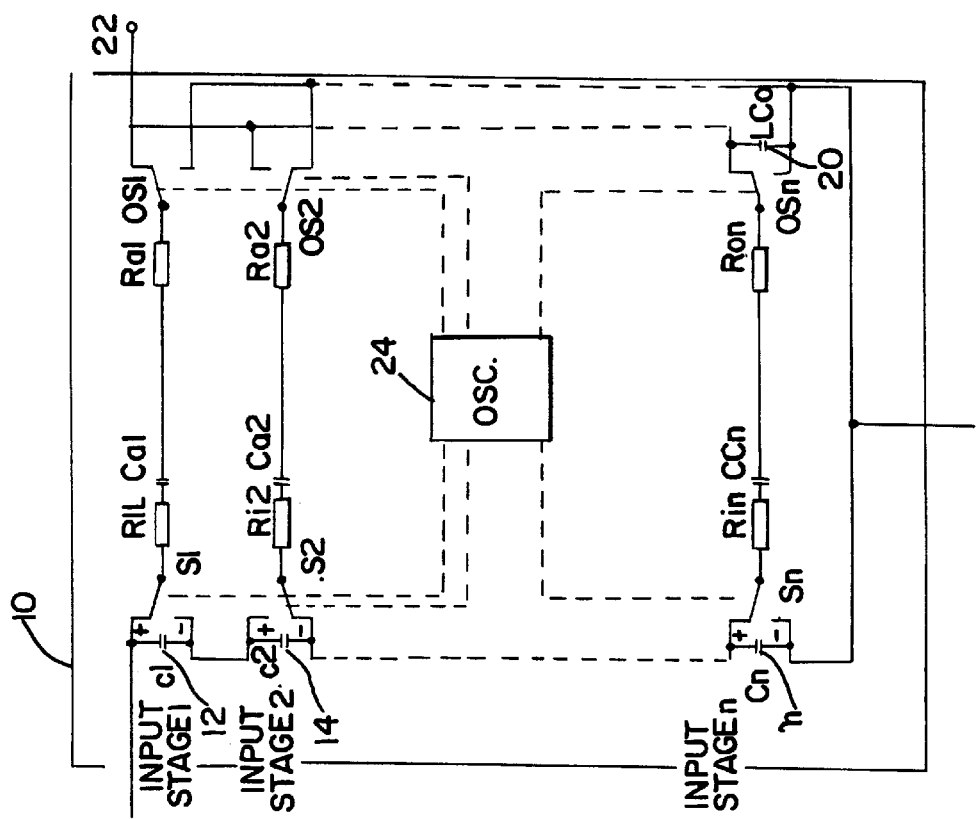
FIG. 2A is a block diagram of a variation of the charge pump circuit illustrated in FIG. 1 to provide a lower impedance of the charge pump.

The version of the charge pump 10 shown in FIG. 2A has the same input capacitors, switches, resistors, and coupling capacitors as in FIG. 1. However, the n input switches and the n output switches, OS1, OS2, . . . OSn, are coupled in parallel to corresponding ones of the n input switches and are switched in antiphase as shown to produce a detected voltage conversion. Each of the n parallel output switches alternately couples the positive and negative output of the corresponding one of the n input capacitors to the output capacitor, $C_o$, to generate an output voltage of $$V_o = \frac{V_{in}}{n}$$

and a pulse-gating circuit 24 is provided again for synchronously switching the n parallel output switches with the n parallel input switches to provide the output voltage and the output current from the output capacitor 20, the n parallel output switches reducing the impedance of the converter 10. Thus, the circuit of FIG. 2 operates essentially the same as the circuit of FIG. 1 except that it has a lower operating impedance of the charge pump.

Figure 2B:
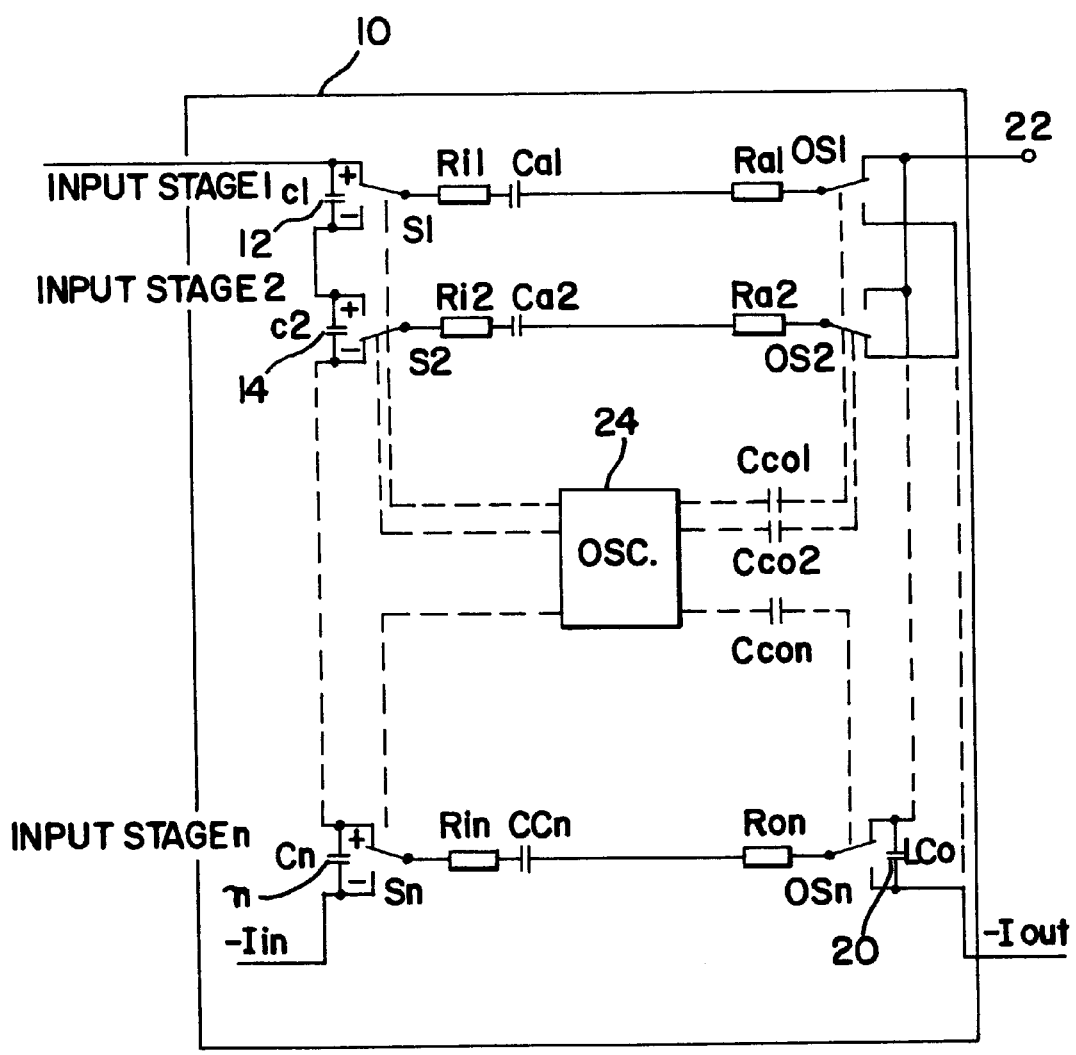
FIG. 2B is similar to FIG. 2A except that the input and output are isolated by galvanically isolating the oscillator signal from the output switches with the use of capacitors.

In FIG. 2B, the circuit is essentially the same as in FIG. 2A except the common ground line has been eliminated and output coupling capacitors $Cc_1$–$C_{con}$ have been placed in the oscillator switching lines to isolate the oscillator signals galvanically from the output switches while transmitting power across the capacitors $C_{c1}$–$C_{cn}$.

FIG. 3 is a second version of the novel charge pump that produces an output voltage, $$V_o = \frac{V_{in}}{n}.$$

In this embodiment, the input capacitors, C1, C2 through Cn–1, are the same as the Cn–1 capacitors of FIG. 1. However, the nth capacitor 36 in the series is the output capacitor, $C_o$, for generating an output voltage. The output switch 38 is in series with the remaining n–1 parallel input switches C1, C2, . . . Cn–1 so that the output voltage stage replaces one of the input voltage stages but the relation is still:

$$V_o = \frac{V_{in}}{n},$$

and the output current, $I_o=nI_{in}$. Thus, if 10 V were on the input terminal 16, it would be divided equally between the capacitors C1 through Cn–1 and the output capacitor 36 because the output capacitor 36 is also in the series. Thus, there are ten capacitors in the series. Each of those capacitors would develop one volt across it. Thus, the output capacitor 36 does develop an output voltage of:

$$V_o = \frac{V_{in}}{n}.$$

However, coupled to the switch 38 on line 40 are the parallel voltages of one volt from each of the Cn–1 series capacitors. This one volt is also equal to $$V_o = \frac{V_{in}}{n}.$$

The output current remains the same since all capacitors are contributing the current in parallel. Thus, $I_o=nI_{in}$. Again, of course, an oscillator 24 is provided to operate all of the switches in synchronism.

FIG. 4 is a variation of the circuit in FIG. 3 in order to reduce the total impedance of the charge pump. It is similar to the arrangement shown in FIG. 2 except in this case there are n–1 output switches coupled to corresponding ones of the n–1 input switches in parallel. The n–1 output switches alternately couple the positive and negative outputs of corresponding ones of the n–1 input capacitors to the output capacitor, $C_o$, to generate an output voltage, $$V_o = \frac{V_{in}}{n}$$

and a current output of $nI_{in}$. With each of the output switches, S1, S2, . . . Sn–1, being in parallel, and these switches being Mosfet switches for example, their resistances are in parallel and thus the total impedance of the charge pump 10 is decreased accordingly.

Figure 5:
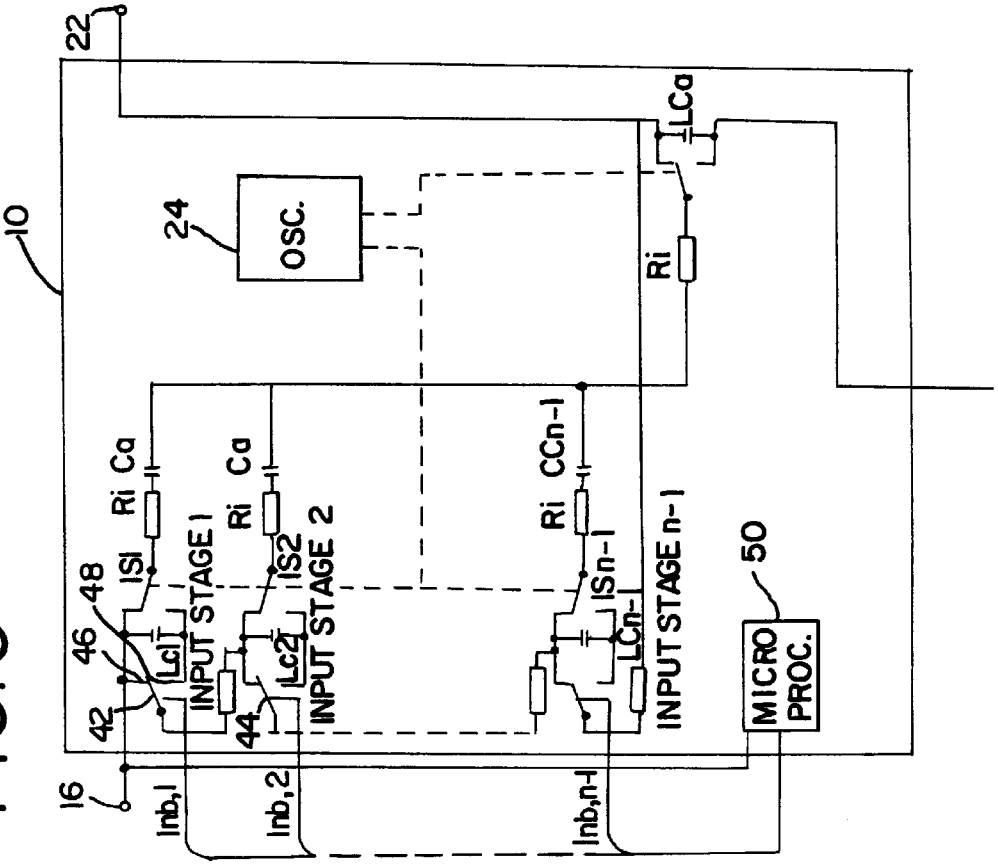
FIG. 5 is a block diagram of the circuit of FIG. 3 further including bypass switches coupled across at least some of the n series connected input capacitors so that each switch can bypass its associated input capacitor as necessary to provide a constant output voltage with a decrease in input voltage/output current.

FIG. 5 is identical to the circuit of FIG. 3 with the exception that it has n–1 bypass switches, 42, 44, . . . Sn–1, coupled to a corresponding one of the n–1 serially-connected input capacitors, C1, C2, . . . Cn–1 to function in a similar manner as the multiplexer 17 in FIG. 1. Each bypass switch, such as switch 42, has a first position 46 electrically bypassing its associated input capacitor and a second position 48 serially coupling its associated capacitor, C1, to the next succeeding one, C2, of the n-serially connected capacitors. A microprocessor 50 is provided for detecting a change in input current and is coupled to the bypass switches, 42, 44, . . . Sn–1, for moving sufficient ones of said bypass switches to the first position reducing the number of serially-connected input capacitors when $I_{in}$ increases and decreasing the number of the n stages when $I_{in}$ increases sufficiently to maintain the total output current, $I_{out}$, in the range of $I_{out}=iI_{in}$ while i is the number of input voltage stages that are not bypassed. Thus, if 1 mA were on line 16 and there were ten stages, counting the output capacitor $C_o$, there would be 1 mA developed across each stage and 10 mA output as explained earlier. If the input current increases to 2 mA, five of the input capacitors could be bypassed leaving five capacitors, counting the output capacitor, to develop 2 mA across each capacitor and thus still provide an output current of 10 mA equal to the input current multiplied by five. Thus, the output current would remain constant at 10 mA. The reverse is also true.

Figure 6:
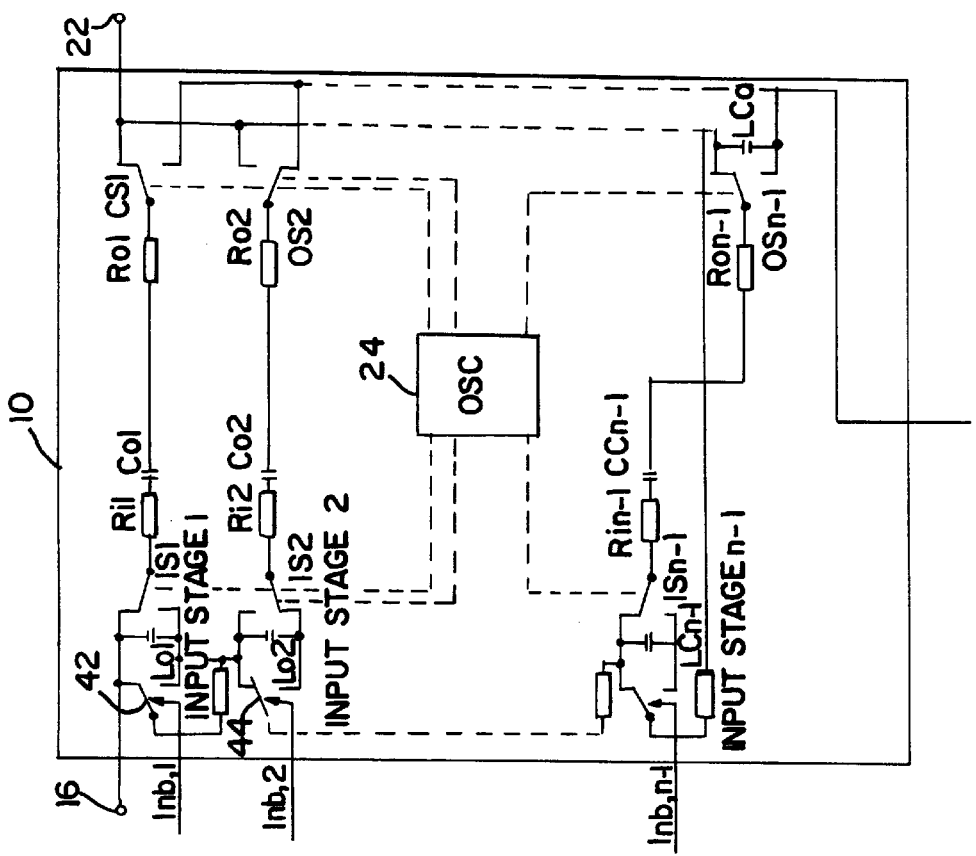
FIG. 6 is a modified version of the block diagram of FIG. 5 to reduce the impedance of the charge pump.

The circuit of FIG. 6 is substantially identical to that shown in FIG. 5 including the bypass switches, 42, 44, . . . Sn–1, except that it again has n–1 output switches, OS1 . . . OSn–1, coupled to corresponding ones of the n–1 input switches in parallel. These n–1 output switches alternately couple the positive and negative outputs of corresponding ones of the n−1 input capacitors to the output capacitor, $C_o$, to generate the output voltage, $$V_o = \frac{V_{in}}{n},$$

and a current output of $nI_{in}$. Thus, the circuit of FIG. 6 has less impedance than the circuit of FIG. 5.

In summary, the basic charge current converter shown in FIG. 1 has an internal impedance and provides a desired voltage and current to a load coupled to output terminal 22. It has a voltage/current source at terminal 16 for providing a voltage, $V_{in}$, and a current, $I_{in}$. It has n input capacitors, 12, 14, . . . n, coupled in series to the voltage current source 16 for developing a voltage on each capacitor of $$V_c = \frac{V_{in}}{n}.$$

Each of the n input capacitors has a positive side and a negative side as shown. An output capacitor 20 provides a voltage output to load connected to load terminal 22. Oscillator 24 synchronously and repetitively couples the voltage on each capacitor, $$V_c = \frac{V_{in}}{n},$$

on the positive and negative sides of each input capacitor in parallel to the output capacitor, $C_o$, to provide an output voltage of $$V_o = \frac{V_{in}}{n}$$

and an output current of $I_o = nI_{in}$.

FIG. 7 illustrates a typical system for supplying two-wire devices from an input voltage/current source and ground with the novel current charging device of the present invention as previously described. As shown in FIG. 7, the current charging device 10 has an input current, $I_i$, on input line 52 and an output current, $I_o$, on output line 54. The input voltage, $V_i$, from terminal 16 appears across the input lines as indicated by arrow 56 and the output voltage, $V_o$, appears across the output lines as illustrated by the arrow 58.

As shown in FIG. 8, the output voltage, $V_o$, can be regulated by regulating the input voltage, $V_i$, thereby enabling a constant output voltage, $V_o$, as well as the ability to control small variations in the output current. Thus, charge pump 10 has n series-connected capacitors as discussed previously and shown in FIGS. 1–6 for receiving a voltage, $V_n$, and current, $I_{in}$, from a voltage/current source 16. It generates an output voltage, $$V_o = \frac{V_{in}}{n},$$

for the circuits of FIGS. 1 and 2 and an output voltage of $$V_o = \frac{V_{in}}{n}$$

for the circuit of FIGS. 3–6. In all cases, an output current, $I_o = nI_{in}$, will appear on output line 62. A variable impedance 70 is coupled across the input voltage/current source 16 and ground 64. An electronic controller 60 is coupled across the charge pump 10 output line 62 and ground for sensing the charge pump output voltage/current and generating an output signal indicated by line 66 that is used to control the variable impedance 70 thereby regulating the input voltage to provide a constant output voltage/current from said charge pump.

FIG. 9 discloses a system for supplying two-wire devices from an input voltage/current source and ground by parallel shunting the charge pump 10 and parallel shunting the output voltage, $V_o$. This circuit enables a negative characteristic impedance of the charge pump 10 to be obtained as well as providing a constant output voltage 14. Thus, in FIG. 9, the system includes charge pump 10 having an impedance between its input 16 and output 62. It has n-series connected capacitors as shown earlier in FIGS. 1–2 or FIGS. 3–6 and generates an output voltage, $$V_o = \frac{V_{in}}{n},$$

as explained earlier. The output current, $I_o = nI_{in}$, is generated on output line 62. The system has a first variable impedance 72 coupling the input 16 of the charge pump 10 to the output line 62 thereof. A second variable impedance 76 is coupled across the output line 62 and ground 64 of the charge pump 10. An electronic controller 60 is coupled across the charge pump 10 output line 62 and ground 64 for sensing the charge pump output voltage/current. A first signal is generated by the electronic controller 60 on line 74 for controlling the first variable impedance 72 as a parallel shunt to cause the charge pump 10 to have a negative characteristic impedance. It also generates a second signal on line 78 that controls the second variable impedance 76 to enable a constant output voltage, $V_o$, from the charge pump.

Figure 13:
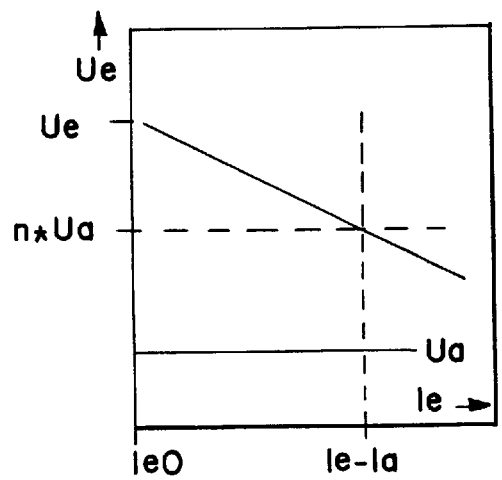
FIG. 13 is a graph illustrating output and input voltages of the circuit in FIG. 9.

FIG. 13 is a graph illustrating the output and input voltages of the circuit of FIG. 9 where the regulation of the output voltage is obtained by parallel shunting the charge pump and shunting the output voltage to ground and which enables a negative characteristic impedance as well as a constant output voltage, $V_a$. The charge pump 10 in FIG. 9 is active up to $I_c = I_a$, where $I_c$=total input current and $I_a$=the current at output terminal 22. For higher input currents, there is only the variable impedance 72 carrying current. Variable impedance 76 will then shunt the output current $I_a$. Therefore, the overall impedance of the circuit is decreasing. At these currents the charge pump becomes inactive and the input voltage becomes smaller than the output voltage.

In the embodiment shown in FIG. 10, the output voltage is regulated by shunting only the charge pump 10. This circuit requires a bidirectional charge pump. This means that the charge pump 10 must be able not only to shift current from input to output, but also be able to shift voltage backwards from output to input. This embodiment necessarily excludes diodes from use as output switching elements.

Thus, in FIG. 10, a bidirectional charge pump 10 has an input and an output for not only conducting current from the input 16 to the output 22, but also shifts voltage backwards from the output 22 to the input 16. The charge pump again has n-series connected capacitors for receiving a voltage, $V_{in}$, and a current, $I_{in}$, from the voltage/current source input 16 and generates an output voltage of $$V_o = \frac{V_{in}}{n}$$

for circuits shown in FIGS. 1 to FIG. 6. It also has an output current, $I_o=nI_{in}$, between the output terminal 22 and ground 64. It has a variable impedance 72 coupling the input of the charge pump 10 to the output 22 thereof. The electronic controller 60 is coupled in parallel with the charge pump output between output terminal 22 and ground 64 for sensing the charge pump output voltage/current and provides an output signal on line 74 for controlling the variable impedance 72 to regulate the charge pump output voltage/current. It is not necessary, but if desired, an input resistor 19 may be added as a second impedance, if the variable impedance 72 loads the charge pump 10 such that the reverse current flows through the charge pump and the input resistor 19 to cause an additional voltage drop.

Figure 14:
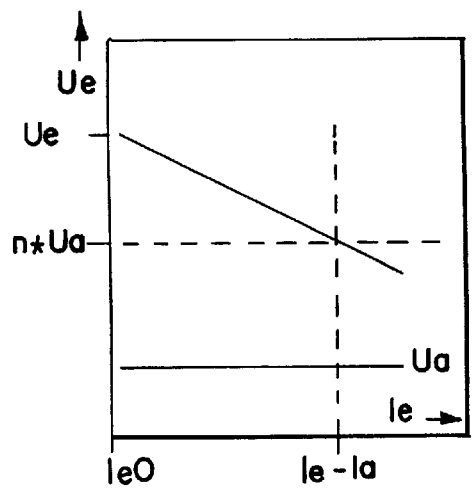
FIG. 14 is a graph illustrataing output and input voltages of the circuit in FIG. 10.

FIG. 14 is a graph illustrating the input and output voltages for the circuit illustrated in FIG. 10. There the output voltage is regulated only by shunting the charge pump. The charge pump is bidirectional and is able not only to shift current from the input to the output, but also to shift voltage backwards from the output to the input. Thus, as the total input current increases, the input voltage decreases as illustrated.

In FIG. 11, an embodiment is shown that has only the output voltage of the charge pump regulated by a controller. In this case, the system includes the charge pump 10 having an impedance between an input 16 and an output 22 and having n-series connected capacitors for receiving a voltage, $V_{in}$, and current, $I_{in}$, from the voltage/current source input terminal 16 and generating an output voltage, $V_o$, on the output terminal 22. The output voltage, $V_o$, is $$V_o = \frac{V_{in}}{n}.$$

In all cases, it has an output current, $I_o=nI_{in}$. It has a variable impedance 76 coupled across the output terminal 22 and the ground 64 of the charge pump 10. An electronic controller 60 is also coupled across the charge pump 10 output terminal 22 and ground 64 for sensing the charge pump output voltage/current. A signal is generated on line 78 by the electronic controller 60 for controlling the variable impedance 76 to enable a constant output voltage, $V_o$, from the charge pump 10.

Figure 12:
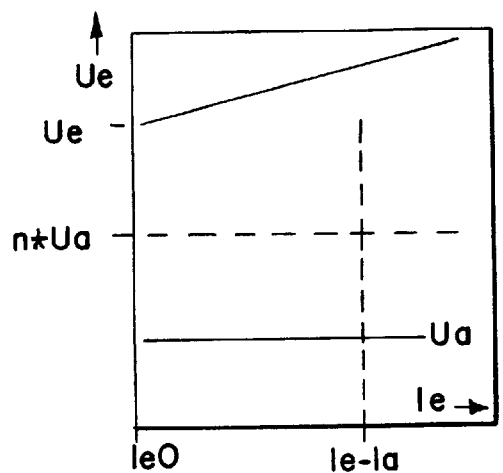
FIG. 12 is a graph illustrating output and input voltages of the circuits of FIGS. 1–4.

FIG. 12 is a graph illustrating the output voltage, $V_a$, for the circuit shown in FIG. 11 wherein the output voltage is constant but the input voltage, $V_c$, increases with increasing input current.

Thus, there has been disclosed a novel current converter or charge pump and circuit systems for using the charge pump to supply two-wire devices. The basic charge pump consists of n capacitors connected in series across an input voltage. This means that each capacitor then carries a voltage of the input voltage divided by the number of capacitors n. This voltage is transferred in parallel to an output capacitor that combines the currents from all of the n capacitors but maintains the voltage that is present across one of the capacitors or $$\frac{V_{in}}{n}.$$

In other versions the impedance of the charge pump can be decreased by providing output switches in parallel with each other and with each output switch coupled to a corresponding one of the input switches, thus providing the same output voltages and currents but with a much smaller impedance.

In another version, the nth capacitor in series can also be used as the output capacitor, thus generating a voltage of $$V_o = \frac{V_{in}}{n}$$

across the output capacitor.

In still another embodiment, bypass switches may be connected across the input capacitors and coupled to a microprocessor for bypassing or adding input capacitors in the series as needed as input current decreases, or increasing to maintain a constant output voltage/current/power in steps of 1/n.

The novel invention also discloses a system for supplying two-wire devices by a voltage or current source. The system comprises a current-raising charge pump that contains several parallel input switches and at least one output switch, an oscillator circuit that generates the switching cycle, several series-connected input capacitors that store and stabilize a single input voltage value and at least one output capacitor to stabilize the output voltage. Such system may include a continuous regulator that bypasses a part of the input current at the charge pump.

In another version of the system for supplying two-wire devices, the parallel regulator is placed in parallel to the input voltage.

In still another version, a first regulator is placed between the input and output of the charge pump, thus shunting the charge pump, and a second regulator is placed in parallel with the output voltage. The regulator also may be placed only between the input and the output to shunt the charge pump.

Further, the input switches and output switches that are used in the charge pump may be discrete semiconductor switches such as transistors, field effect transistors, and the like.

The output switches could also be diodes but could not be used where a bidirectional charge pump is required. The input and output switches may be silicon gates.

In any of the embodiments, several of the input stages can be turned off by bypassing the stages with switches and the bypassing switches may be semiconductor switches.

Where the regulator is used to bypass a part of the input current, the bypass current may be controlled by monitoring the output current instead of the output voltage.

The corresponding structures, materials, acts, and equivalents of all means or step plus function elements in the claims below are intended to include any structure, material, or act for performing the function in combination with other claimed elements as specifically claimed.

We claim:

1. A current converter having an impedance and providing a desired voltage and current to a load and comprising:
   a voltage/current source for supplying an input voltage, $V_{in}$, and input current, $I_{in}$;
   a current-increasing charge pump having n stages of n-series connected input capacitors coupled to said voltage/current source for developing an output voltage, $$V_o = \frac{V_{in}}{n},$$

across each capacitor, each capacitor having a positive and a negative output;

an output capacitor having a corresponding input and output for coupling to said load;

n parallel-connected input switches, each input switch being coupled to a corresponding one of the n input capacitors and being capable of alternately and synchronously moving from a first position to a second position for connecting the positive output and the negative output of said corresponding capacitor to said output capacitor thereby producing an output voltage, $$V_o = \frac{V_{in}}{n},$$

and an output current, $I_o$, of $nI_{in}$.

2. The current converter of claim 1 further comprising:
a single output switch coupled between said parallel input switches and said output capacitor, said single switch alternately moving from a first position to a second position to couple the n capacitor positive outputs and the n capacitor negative outputs to the output capacitor; and
a pulse-generating circuit for synchronously switching said single output switch with said n parallel input switches to provide said output voltage and said output current from said output capacitor.

3. The current converter of claim 1 further comprising:
a coupling capacitor interposed between each of the n input switches and said single switch for blocking DC voltage and passing the AC voltage as said input switches move synchronously from said first to said second position.

4. The current converter of claim 1 further comprising:
a multiplexer coupled between the input current to one of the 1 to (n-1) stages for selectively bypassing from 1 to (n-1) of said n stages to provide essentially a constant output current of $I_o=nI_{in}$ and $$V_o = \frac{V_{in}}{n},$$

over a variable range of input voltages; and
a microprocessor coupled to the input multiplexer and to said current source for detecting the input current variation and selecting said multiplexer output as necessary to maintain the output current, $I_o=nI_{in}$ and $$V_o = \frac{V_{in}}{n}.$$

5. The current converter of claim 1 further comprising:
n output switches coupled in parallel to corresponding ones of said n input switches;
each of said n parallel output switches alternately coupling the positive and the negative outputs of the corresponding one of the n input capacitors to said output capacitor to generate an output voltage of $$V_o = \frac{V_{in}}{n}$$

and output current, $I_o=nI_{in}$; and
a pulse-generating circuit for synchronously switching said n parallel output switches with said n parallel input switches to provide said output voltage and said output current from said output capacitor, said n parallel output switches reducing the impedance of said current converter.

6. The current converter of claim 1 wherein:
said nth capacitor in said series is said output capacitor for generating an output voltage, $$V_o = \frac{V_{in}}{n};$$

said nth input switch being in series with the remaining n-1 parallel input switches; and
said nth capacitor generating said output current, $I_o=nI_{in}$.

7. The current converter of claim 6 further comprising a pulse-generating circuit for synchronously switching said nth switch and said remaining n-1 switches to provide said total output voltage from said nth capacitor.

8. The current converter of claim 6 further comprising:
n-1 output switches coupled to corresponding ones of said n-1 input switches in parallel to reduce the impedance of said current; and
said n-1 of said output switches alternately coupling the positive and the negative outputs of corresponding ones of the n-1 input capacitor to said output capacitor to generate said output voltage, $$V_o = \frac{V_{in}}{n}.$$

9. The current converter of claim 6 further comprising:
n-1 bypass switches coupled to a corresponding one of n-1 serially-connected input capacitors;
each bypass switch having a first position electrically bypassing its associated input capacitor and a second position serially coupling its associated capacitor to the next succeeding one of said n serially-connected capacitors; and
a microprocessor coupled to said voltage source and said bypass switches for detecting a change in input voltage and moving sufficient ones of said bypass switches to said first position to bypass their corresponding capacitors and reduce the number of stages, n, when $I_{in}$ increases/$V_{in}$ decreases and increasing the number of said n stages when $I_{in}$ decreases/$V_{in}$ increases to maintain the total output voltage, $V_o$, across said output capacitor in the range of $$V_o = \frac{V_{in}}{n}.$$

10. The current converter of claim 8 further comprising:
n-1 bypass switches coupled to a corresponding one of n-1 serially-connected input capacitors;

each bypass switch having a first position electrically bypassing its associated input capacitor and a second position serially coupling its associated capacitor to the next succeeding one of said n serially-connected capacitor; and a microprocessor coupled to said voltage source and said bypass switches for detecting a change in input voltage and moving sufficient ones of said bypass switches to said first position to bypass their associated capacitors and reduce the number of said stages, n, when $I_{in}$ increases/$V_{in}$ decreases and increasing the number of said n stages when $I_{in}$ decreases/$V_{in}$ increases to maintain said total output voltage, $V_o$, across said output capacitor in the range of $$V_o = \frac{V_{in}}{n}$$

and the output current, $I_o = nI_{in}$.

11. The current converter of claim 1 further comprising:

n−1 bypass switches coupled to a corresponding one of n−1 serially-connected input capacitors;

each bypass switch having a first position electrically bypassing its associated input capacitor and a second position serially coupling its associated capacitor to the next succeeding one of said n serially-connected capacitors; and a microprocessor coupled to said voltage source and said bypass switches for detecting a change in input voltage and moving sufficient ones of said bypass switches to said first position to bypass the corresponding capacitors and reduce the number of said n stages when $I_{in}$ increases/$V_{in}$ decreases and increasing the number of said n stages when $I_{in}$ decreases/$V_{in}$ increases sufficient to maintain the total output voltage, $V_o$, across said output capacitor as $$V_o = \frac{V_{in}}{n}.$$

12. The current converter of claim 1 wherein the current converter is bidirectional and can conduct current from said voltage/current source to said output and from said output to said voltage/current source.

13. A current converter having an internal impedance and providing a desired voltage and current to a load and comprising:

a voltage/current source providing a voltage, $V_{in}$, and a current, $I_{in}$;

n input capacitors coupled in series to said voltage current source for developing a voltage across each input capacitor of $$V_c = \frac{V_{in}}{n},$$

each of the n input capacitors having a positive side and a negative side;

an output capacitor for providing a voltage output to a load; and means for synchronously and repetitively coupling said voltage, $$V_c = \frac{V_{in}}{n},$$

on the positive and negative sides of each input capacitor in parallel to said output capacitor to provide an output voltage of $$V_o = \frac{V_{in}}{n},$$

and an output current of $I_o = nI_{in}$.

14. The current converter of claim 13 wherein said coupling means comprises:

n parallel-connected input switches, each input switch being coupled to a corresponding one of the n input capacitors for alternate connection to the positive and negative sides of the corresponding input capacitor; and a single output switch coupled between the parallel input switches and said output capacitor for transferring said parallel charges, $$\frac{V_{in}}{n},$$

to said output capacitor.

15. A current converter having an impedance and providing to a load an output voltage, $V_o$, less than the input voltage, $V_{in}$, and an output current, $I_o$, greater than the input current, $I_{in}$, comprising:

n series-connected input capacitors for receiving said input voltage and input current, each input capacitor having a positive and a negative side;

an output capacitor having an input and an output coupled to said load;

n parallel-connected input switches, each input switch coupled to a corresponding one of said n input capacitors and being capable of alternately and synchronously moving from a first position coupled to the positive side of said corresponding input capacitor to a second position coupled to the negative side of said corresponding input capacitor;

n output switches coupled in parallel to corresponding ones of said n input switches;

each of said n parallel output switches alternately coupling the positive and negative sides of the corresponding one of the n input capacitors to said output capacitor to generate an output voltage, $$V_o = \frac{V_{in}}{n}; \text{ and}$$

a pulse-generating circuit for synchronously switching said n parallel output switches with said n parallel input switches to provide said output voltage and said output current from said output capacitor, said n parallel output switches reducing the impedance of said converter.

16. A current converter for providing to a load an output voltage, $V_o$, that is less than the input voltage, $V_{in}$, and an output current, $I_o$, that is greater than the input current, $I_{in}$, said converter comprising:

n input capacitors coupled in series for receiving said input voltage, $V_{in}$, and said output current, $I_{in}$, each of the n series-coupled capacitors developing a voltage, $$V_c = \frac{V_{in}}{n},$$

each of the input capacitors having a positive side and a negative side; an output capacitor formed by the nth series-connected capacitor;

n parallel input switches, each being coupled to a corresponding one of said n input capacitors for alternate connection to the positive and negative sides of the corresponding one of the n input capacitors;

said nth capacitor in said series being the output capacitor for generating a first output voltage, $$V_o = \frac{V_{in}}{n};$$

said nth input switch being in series with the remaining n−1 parallel input switches to provide said output current, $I_o = nI_{in}$; and a pulse-generating circuit for synchronously switching said n switches to provide said total output voltage, $V_o$, and said output current, $I_o$.

17. The current converter as in claim 16 further comprising:
  n−1 bypass switches coupled to a corresponding one of n−1 serially-connected input capacitors;
  each bypass switch having a first position electrically bypassing its associated input capacitor and a second position serially coupling its associated capacitor to the next succeeding one of said n serially-connected capacitor; and
  a microprocessor coupled to said voltage source and said bypass switches for detecting a change in input voltage/current and moving sufficient ones of said bypass switches to said first position bypassing its corresponding capacitor and reducing the number of said stages when $V_{in}$ decreases/$I_{in}$ increases and increasing the number of n stages when $V_{in}$ increases/$I_{in}$ decreases sufficiently to maintain said total output voltage, $V_o$, across said input capacitor of $$V_o = \frac{V_{in}}{n}.$$

18. A current converter for providing to a load an output voltage, $V_o$, that is less than an input voltage, $V_{in}$, and an output current, $I_o$, that is greater than the input current, $I_{in}$, said converter comprising:
  n series-connected input capacitors coupled to the input voltage, $V_{in}$, each of said n series coupled capacitors developing a voltage, $$V_c = \frac{V_{in}}{n},$$

each of said n capacitors having a positive side and a negative side; an output capacitor formed by the nth series-connected capacitor for developing a first output voltage of $$V_o = \frac{V_{in}}{n};$$

n parallel input switches, each being coupled to a corresponding one of said n input capacitors for alternating connection to the positive and negative sides of a corresponding one of the n input capacitors;
  n−1 output switches coupled to corresponding ones of said n−1 input switches in parallel; and
  said n−1 of said output switches alternately coupling the positive and the negative sides of corresponding ones of the n−1 input capacitors to said output capacitor to generate a output voltage, $$V_o = \frac{V_{in}}{n},$$

and a current output of $nI_{in}$.

19. A system for supplying two-wire devices from an input voltage/current source and ground, said system comprising:
  a charge pump having n series-connected capacitors for receiving a voltage, $V_{in}$, and current, $I_{in}$, from said voltage/current source and generating a constant output voltage of at least $$V_o = \frac{V_{in}}{n}$$

and an output current, $I_o = nI_{in}$, between an output terminal and ground;
  a variable impedance coupled across said input voltage/current source and ground; and
  an electronic controller coupled across said charge pump output terminal and ground for sensing said charge pump output voltage/current and generating an output signal that is used to control said variable impedance thereby regulating the input voltage to provide a constant output voltage/current from said charge pump.

20. The system of claim 19 wherein said charge pump generates an output voltage of $$V_o = \frac{V_{in}}{n}$$

while maintaining said output current, $I_o = nI_{in}$.

21. A system for supplying two-wire devices from an input voltage/current source and ground, said system comprising:
  a charge pump having an impedance between an input and an output and having n series-connected capacitors for receiving a voltage, $V_{in}$, and current, $I_{in}$, from said voltage/current source input and generating a constant output voltage of at least $$V_o = \frac{V_{in}}{n},$$

and an output current, $I_o = nI_{in}$, between an output terminal and ground;
  a first variable impedance for shunting said charge pump by coupling the input of said charge pump to the output thereof, a second variable impedance coupled across the output terminal and ground of said charge pump;

an electronic controller coupled across said charge pump output terminal and ground for sensing said charge pump output voltage/current;

a first signal generated by said electronic controller for controlling said first variable impedance as a parallel shunt to cause said charge pump to have a negative characteristic impedance; and a second signal generated by said electronic controller for controlling said second variable impedance to enable a constant output voltage, $V_o$, from said charge pump.

22. A system for supplying a two-wire device from an input voltage/current source and ground, said system comprising:

a bidirectional charge pump having an input and an output for not only conducting current from said input to said output, but also shifting voltage backward from said output to said input;

said charge pump having an impedance between said input and output and having n series-connected capacitors for receiving a voltage, $V_{in}$, and current, $I_{in}$, from said voltage/current source input and generating a constant output voltage of at least $$V_o = \frac{V_{in}}{n},$$

and an output current, $I_o = nI_{in}$, between an output terminal and ground;

a variable impedance for shunting said charge pump by coupling the input of said charge pump to the output thereof;

an electronic controller coupled in parallel with the charge pump output for sensing said charge pump output voltage/current; and an output signal generated by said electronic controller for controlling said variable impedance to regulate said charge pump output voltage/current.

23. The system of claim 22 further including a second impedance added to the input of the charge pump, to reduce the input voltage, $V_{in}$, if said variable impedance, parallel to the charge pump, including the second impedance, loads the charge pump such that the reverse current through the charge pump flows in reverse through the second impedance and enables an additional voltage drop in that case of loading the overcurrent at the charge pump.

24. A system for supplying two-wire devices for an input voltage/current source and ground, said system comprising:

a charge pump having an impedance between and input and an output and having n series-connected capacitors for receiving a voltage, $V_{in}$, and current, $I_{in}$, from said voltage/current source input and generating a constant output voltage of at least $$V_o = \frac{V_{in}}{n},$$

and an output current, $I_o = nI_{in}$, between an output terminal and ground;

a variable impedance coupled across the output terminal and ground of said charge pump;

an electronic controller coupled across said charge pump output terminal and ground for sensing said charge pump output voltage/current; and a signal generated by said electronic controller for controlling said variable impedance to enable a constant output voltage, $V_o$, where an increasing input current, $I_{in}$, will cause an increasing input voltage, $V_{in}$.

* * * * *

UNITED STATES PATENT AND TRADEMARK OFFICE
CERTIFICATE OF CORRECTION

PATENT NO. : 6,064,582
DATED : May 16, 2000
INVENTOR(S) : Löchner et al.

It is certified that error appears in the above-identified patent and that said Letters Patent is hereby corrected as shown below:

On the Title Page:
  Field [19], "Luchner et al." should read --Löchner et al.--.
  Field [75] Inventors, the first-named inventor's last name is incorrectly spelled and should be corrected to read --Löchner--.
Column 1, line 31, delete "modem" and replace with --modern--.
Column 5, line 28, delete "illustraing" and replace with --illustrating--.
Column 10, line 46, delete "$I_c$" and replace with --$I_e$--, both occurrences.
Column 16, line 15, delete "ciaim" and replace with --claim--.

Signed and Sealed this

Twenty-seventh Day of March, 2001

NICHOLAS P. GODICI

Attest:

Attesting Officer

Acting Director of the United States Patent and Trademark Office